United States Patent [19]

Maeda et al.

[11] Patent Number: 5,050,698
[45] Date of Patent: Sep. 24, 1991

[54] SYSTEM AND METHOD FOR CONTROLLING VEHICLE SPEED TO DESIRED CRUISE SPEED FOR VEHICLES

[75] Inventors: Takenori Maeda; Yukio Ikeda; Yasunori Shimada, all of Kanagawa, Japan

[73] Assignee: Atsugi Unisia Corporation, Kanagawa, Japan

[21] Appl. No.: 460,010

[22] Filed: Jan. 2, 1990

[30] Foreign Application Priority Data

Jan. 12, 1989 [JP] Japan .................................. 1-2416[U]

[51] Int. Cl.⁵ .............................................. B60K 31/04
[52] U.S. Cl. .................................... 180/175; 180/178; 364/426.04
[58] Field of Search ............... 180/175, 176, 177, 178, 180/179; 364/426.04

[56] References Cited

U.S. PATENT DOCUMENTS

| 4,766,971 | 8/1988 | Hyodo | 180/178 |
| 4,797,826 | 1/1989 | Onogi et al. | 180/179 |
| 4,829,437 | 9/1989 | Suzuki et al. | 280/179 |
| 4,921,063 | 5/1990 | Masuda | 180/178 |

FOREIGN PATENT DOCUMENTS

| 0163735 | 8/1985 | Japan | 180/176 |
| 62-34224 | 7/1987 | Japan . | |

Primary Examiner—David M. Mitchell
Attorney, Agent, or Firm—Ronald P. Kananen

[57] ABSTRACT

A system and method for automatically controlling a vehicle speed to a set desired cruise speed are disclosed in which a cruise speed control operation of a control portion is carried out only when a power supply for the system is turned on and all of vehicle speed set switches are turned off.

5 Claims, 2 Drawing Sheets

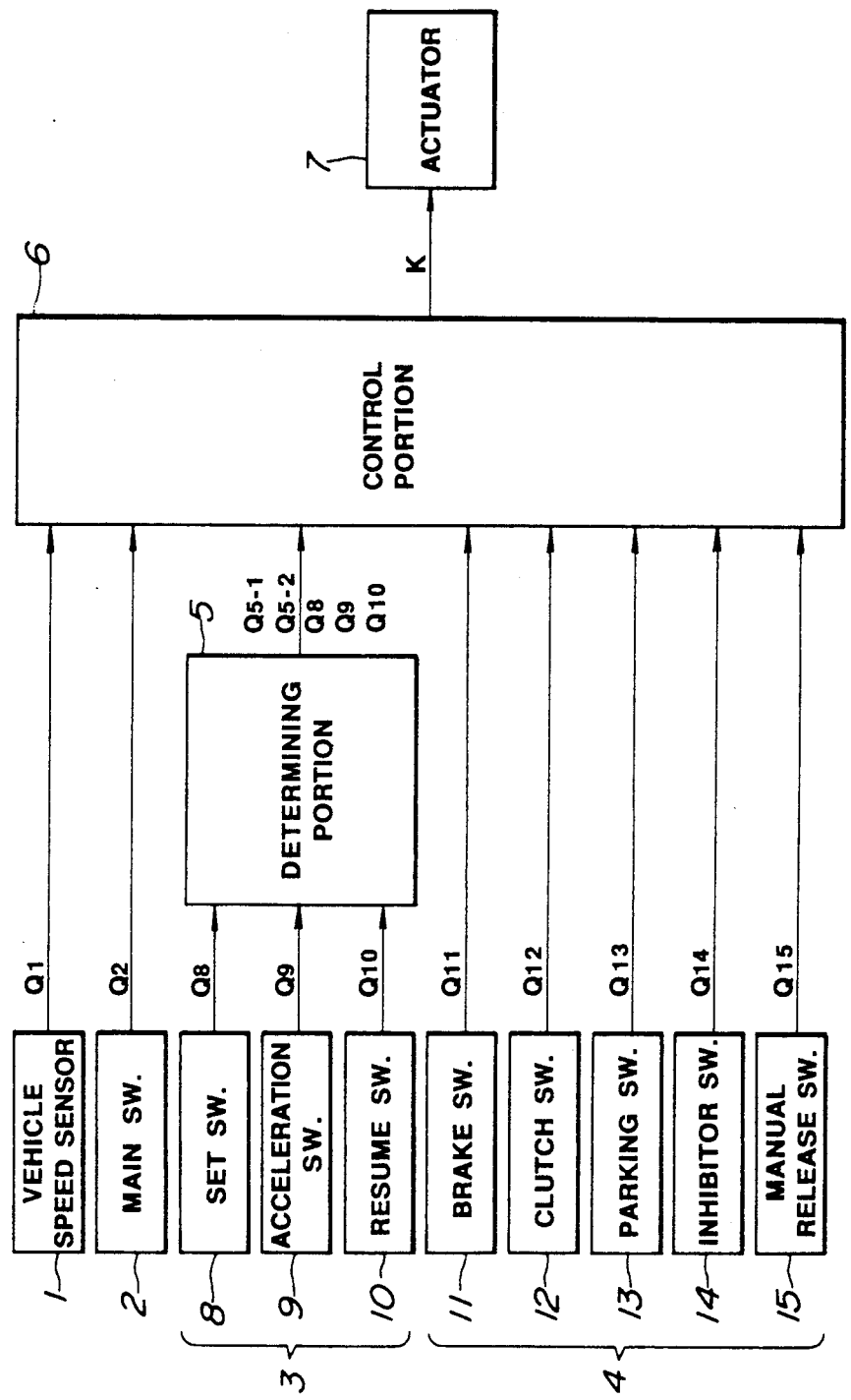

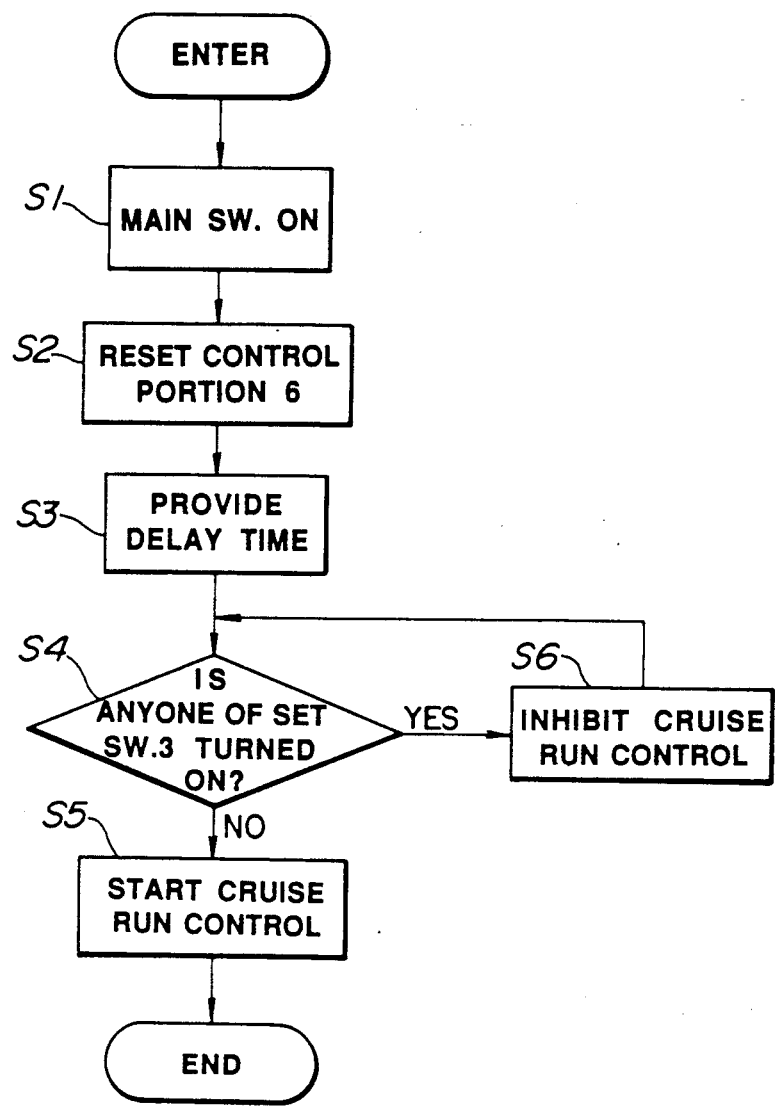

SYSTEM AND METHOD FOR CONTROLLING VEHICLE SPEED TO DESIRED CRUISE SPEED FOR VEHICLES

BACKGROUND OF THE INVENTION (1) Field of the Invention

The present invention relates generally to a system and method for automatically controlling a vehicle speed to a desired cruise speed applicable to vehicles.

(2) Description of the Background Art

A system for automatically controlling a vehicle speed to a desired cruise speed includes a vehicle speed setting switch group having a set switch, an acceleration switch, and a resume switch and a microcomputer which compares a target vehicle speed set by the vehicle speed setting switch with an actual vehicle speed detected by a vehicle speed sensor and adjusts a fuel supply quantity (an opening angle of an engine throttle valve) supplied to a vehicular engine so that the vehicle runs at the set vehicle speed and maintains the vehicle speed thereat. In addition, a plurality of cancel switches such as a brake switch are provided to cancel the cruise run operation of the above-described system.

The microcomputer serves as a control portion of the cruise speed controlling system. The control portion is reset when a power supply of the above-described system is turned on so that a storage of the control portion in which the previously set vehicle speed is stored is cleared for safe operation of the vehicle.

Thereafter, the control portion accepts an input vehicle set speed signal derived from the vehicle speed setting switch.

Such a cruise speed controlling system as described above is exemplified by a Japanese Patent Application Second Publication (Non-examined) No. Showa 62-34224 published on July 24, 1987.

However, since the above-described system accepts the incoming vehicle speed setting signal derived from the vehicle speed setting switch group after the control portion is reset, the control portion operates for the vehicle to run at a cruise speed in the control portion immediately after the reset when any one switch of the vehicle speed setting switch group is turned on or remains on due to some failure. For example, when the acceleration switch remains on when the power supply is turned on due to some failure, the control portion operates for the vehicle to accelerate.

SUMMARY OF THE INVENTION

It is an object of the present invention to provide a system and method for automatically controlling a vehicle speed to a desired cruise speed which assures an operation of a control portion when a power supply is turned on.

The above-described object can be achieved by providing a system for automatically controlling a vehicle speed to a desired cruise speed comprising: a) first means for determining whether any one of a plurality of vehicle speed setting switches is in an on state when power is supplied to a control portion, the control portion carrying out the control operation such that the vehicle runs at a set desired cruise speed; and b) second means for starting a control operation of the control portion when all of the vehicle speed setting switches are in off states and for inhibiting the operation of the control portion when any one of the vehicle speed setting switches is in an on state.

The above-described object can also be achieved by providing a method for automatically controlling a vehicle speed to a set desired cruise speed, comprising the steps of: a) determining whether any one of a plurality of vehicle speed setting switches is in an on state when power is supplied to a control portion, the control portion carrying out the control operation such that the vehicle runs at a set desired cruise speed; and b) starting a control operation of the control portion when all of the vehicle speed setting switches are in off states and inhibiting the operation of the control portion when any one of the vehicle speed setting switches is in an on state.

BRIEF DESCRIPTION OF THE DRAWINGS

FIG. 1 is a circuit block diagram of a system for automatically controlling a vehicle speed to a desired cruise speed for a vehicle in a preferred embodiment according to the present invention.

FIG. 2 is an operational flowchart executed by the cruise speed controlling system in the preferred embodiment.

DETAILED DESCRIPTION OF THE PREFERRED EMBODIMENTS

Reference will hereinafter be made to the drawings in order to facilitate a better understanding of the present invention.

FIG. 1 shows a preferred embodiment of a system for automatically controlling a vehicle speed to a desired cruise speed.

A vehicle speed sensor 1 for detecting a vehicle speed is connected to a control portion 6. A vehicle speed signal $Q_1$ is transmitted to the control portion 6 from the vehicle speed sensor 1.

A main switch 2 is of a transfer contact type which holds on and off positions. When the main switch 2 is turned on, a power supply voltage denoted by $Q_2$ is transmitted to the control portion 6. When the operating power $Q_2$ is supplied to the control portion 6 with the main switch 2 turned on, the activated control portion 6 receives the vehicle speed signal $Q_1$ from the vehicle speed sensor 1.

A vehicle speed set switch 3 outputs a vehicle set speed to the control portion 6. The vehicle speed set switch 3 includes a set switch 8, an acceleration switch 9 and a resume switch 10.

The set switch 8 is of an automatic return type. When an accelerator pedal is depressed so that an actual vehicle speed becomes the vehicle set speed, a set signal $Q_8$ is derived from the set switch 8 to the control portion 6 when the set switch 8 is turned on and thereafter turned off so that a desired vehicle speed is set as the vehicle set speed S.

The acceleration switch 9 is of an automatic return type. When the vehicle speed reaches a desired speed which exceeds the previously set speed S with the switch 9 being continued to be pushed, an acceleration signal $Q_9$ as the vehicle speed set signal is outputted to the control portion 6 when the manual push on the switch 9 is released so that the desired speed which exceeds the previously set vehicle speed S is set as a newly set vehicle speed S.

The resume switch 10 is of an automatic return type. When a brake pedal (not shown) or a clutch pedal (not shown) is depressed or a shift lever (automatic transmission is placed at a neutral range or at a parking range, so that the cruise run by means of the control portion 6 is released and the vehicle is temporarily decelerated, a resume signal $Q_{10}$ as the vehicle set speed signal is outputted to a control portion 6 when the resume switch 10 is pushed to turn on and release so that the set vehicle speed S before the release is retrieved from a memory of the control portion 6.

A cancel switch 4 outputs a release signal to the control portion 6. The cancel switch 4 includes a brake switch 11, a clutch switch 12, a parking switch 13, an inhibitor switch 14, and a manually released self-contained switch 15.

The brake switch 11 is of an automatic return type. When a braking operation is carried out with the brake pedal depressed, a release signal $Q_{11}$ is outputted to the control portion 6.

The clutch switch 12 is of an automatic return type. When a power transmission from the engine with the clutch pedal (not shown) depressed is released, a release signal $Q_{12}$ is outputted to the control portion 6.

The parking switch 13 outputs a release signal $Q_{13}$ to the control portion 6 when the braking operation is carried out by means of the parking brake.

The inhibitor switch 14 is of an automatic return type. When the shift lever (not shown) is placed at a neutral range or at a parking range, a release signal $Q_{14}$ is outputted to the control portion 6.

The manual release self-contained switch 15 is of an automatic return type. When it is pushed manually to be turned on, a release signal $Q_{15}$ is outputted to the control portion 6.

A determining portion 5, upon supply of operating power $Q_2$ to the control portion 6, confirms on and off operations of the vehicle speed setting switch 3, starts a control operation of the control portion 6 if the vehicle speed set switch 3 is in the off state, and inhibits the control operation of the control portion 6 if the vehicle speed setting switch 3 is in the on state.

Specifically, when the determining portion 5 receives a signal corresponding to the operating power $Q_2$ and caused by the on state of the main switch 2, the on-and-off operations of the set switch 8, acceleration switch 9, and resume switch 10 are confirmed depending on whether any one of the set signal $Q_8$, acceleration signal $Q_9$, and resume signal $Q_{10}$ is outputted from the corresponding set switch 8, acceleration switch 9, and resume switch 10.

If each of the set switch 8, acceleration switch 9, and resume switch 10 is in the off state, a control operation start signal $Q_{5-1}$ is outputted.

In other words, if any one of the set switch 8, acceleration switch 9, and resume switch 10 is turned on, the control operation inhibit signal $Q_{5-2}$ is outputted to the control portion 6.

The control portion 6 is reset when the operating power $Q_2$ is supplied with the main switch 2 turned on by means of a previously set program. After the storage of the control portion 6 storing the set vehicle speed S is cleared, either of the control operation start signal $Q_{5-1}$ or the control operation inhibit signal $Q_{5-2}$ is received from the determining portion 5 so that the vehicle speed set signal or release signal from the cancel switch 4 is accepted.

FIG. 2 shows a program flowchart of the control portion 6 and determining portion 5 in a structure of the above-described preferred embodiment.

In a section S1, the main switch 2 is turned on so that operating power $Q_2$ is supplied to the control portion 6. In a section S2, the control portion 6 is reset so that the storage for storing the set vehicle speed S is cleared. In a section S3, in a predetermined delay of time from the time at which the reset operation is carried out to the time at which the storage is cleared, either one of the control operation start signal $Q_{5-1}$ or control operation inhibit signal $Q_{5-2}$ is received to confirm the on-and-off state of the vehicle speed set switch 3.

In more detail, any one or all of the set switch 8, acceleration switch 9, and resume switch 10 are in the off state. Then, in a case where the control operation start signal $Q_{5-1}$ is inputted to the control portion 6 from the determining portion 5, the control portion 6 determines that the vehicle speed set switch 3 is turned off in a section S4. In a section S5, the control operation of the cruise speed of the vehicle by means of the control portion 6 becomes possible.

When the control operation becomes enabled, the vehicle speed signal $Q_1$ is fetched from the vehicle speed sensor 1 into the control portion 6. With the vehicle speed signal $Q_1$ fetched into the control portion 6, when the set vehicle speed S is set by the control portion 6 due to any one of the on-and-off operations of the set switch 8, acceleration switch 9, and resume switch 10, the control portion 6 compares the actual vehicle speed with the set vehicle speed S through a previously set program. The output signal K according to the result of comparison is outputted to a fuel supply drive portion 7 of a vehicular engine.

With the key switch and main switch 2 turned off to interrupt the operating power to the control portion 6 and with operations of a plurality of cancel switches 4 during the cruise run, the release signals $Q_{11}$ through $Q_{15}$ are outputted to the control portion 6 so that the output signal K is interrupted and the cruise run by means of the control portion 6 is released.

The fuel supply drive portion 7 adjusts the fuel supply quantity to the engine (not shown) so that the vehicle runs at a cruise speed S.

On the other hand, in a section S4 of FIG. 2, in a case where any one of the set switch 8, acceleration switch 9, and resume switch 10 fails and remains in the on state and the control operation inhibit signal $Q_{5-2}$ is inputted to the control portion 6 from the determination portion 5, the control portion 6 determines that the vehicle speed set switch 3 is turned on. In a section S6, the control operation on the cruise run of the vehicle is inhibited having a priority over the vehicle set signal derived from the vehicle speed set switch 3. That is to say, in an inhibit state, even when any one of the set switch 8, acceleration switch 9, and resume switch 10 is operated by an operator, the control portion 6 halts the comparison of the set vehicle speed S and actual vehicle speed and does not output the output signal K to the fuel supply drive section 7.

It is noted that the fuel drive section 7 may be constituted by an actuator for actuating an engine throttle valve (not shown). The actuator describe above is exemplified by a U.S. Pat. No. 4,829,437 issued on May 9, 1989, a disclosure of which is hereby incorporated by reference.

The control portion 6 is constituted by the microcomputer and the determining portion 5 may be constituted by a storage portion and a control arithmetic operating unit. In this case, the function of the microcomputer (determining portion) may be programmed by the microcomputer.

As described hereinabove, in the system and method for automatically controlling a vehicle speed to a desired cruise speed, the cruise speed control can be carried out in a normal procedure only when the vehicle speed set switch is turned off with the operating power supplied to the control portion.

Consequently, the vehicle does not enter into the cruise run state irrespective of the driver's intention due to some cause of the vehicle speed setting switch before the main switch is turned on. Therefore, the safety driving of the vehicle can be assured.

It will be appreciated by those skilled in the art that the foregoing description is made in terms of the preferred embodiment and various changes and modifications may be made without departing from the scope of the present invention which is to be defined by the appended claims.

What is claimed is:

1. A cruise control system for an automotive vehicle comprising:

a vehicle speed controlling means for adjusting vehicular traveling speed;

at least one cruise speed setting means for manually commanding a desired cruise speed, said cruise speed setting means being operable between an active state in which a desired cruise speed is commanded and an inactive state in which a command for the desired cruise speed is absent;

a vehicle speed monitoring means for monitoring an actual vehicle traveling speed to produce a vehicle speed indicative signal;

a controller responsive to the manually entered command from said cruise speed setting means for setting a target cruise speed, comparing the actual vehicle traveling speed represented by said vehicle speed indicative signal with said target cruise speed and outputting a cruise control signal for controlling operation of said vehicle speed control means to reduce a difference between said actual vehicle traveling speed and said target cruise speed to zero;

a power supply means for supplying power to said controller, said power supply means including an ON/OFF switch for establishing a power supply for said controller at an ON position for placing said controller at a stand-by state for accepting said cruise speed command as entered, and blocking the power supply at an OFF position; and means, responsive to initiation of said power supply for said controller, for discriminating a status of said cruise speed setting means, enabling said controller when said cruise speed setting means is in an inactive state and disabling said controller when said cruise speed setting means is in an active state.

2. A cruise control system as set forth in claim 1, which further comprises at least a cancel means for commanding cancellation of cruise control operation.

3. A cruise control system for an automotive vehicle for maintaining a vehicular traveling speed at a desired cruise speed, comprising:

a vehicle speed controlling means for adjusting vehicular traveling speed;

at least one cruise speed setting means for manually commanding a desired cruise speed, said cruise speed setting means being operable between an active state in which a desired cruise speed is commanded and an inactive state in which a command for the desire cruise speed is absent;

a vehicle speed monitoring means for monitoring an actual vehicle traveling speed to produce a vehicle speed indicative signal;

a controller responsive to the manually entered command from said cruise speed setting means for setting a target cruise speed, comparing the actual vehicle traveling speed represented by said vehicle speed indicative signal with said target cruise speed and outputting a cruise control signal for controlling operation of said vehicle speed control means to reduce a difference between said actual vehicle traveling speed and said target cruise speed to zero;

a power supply means for supplying power to said controller and including a main power switch for establishing a power supply for said controller at an ON position and blocking said power supply at an OFF position; and means, responsive to an ON-set of said main power switch, for discriminating an operating condition of the cruise control system, for enabling said controller only when a predetermined enabling condition is established and placing said controller at a stand-by state.

4. A cruise control system for an automotive vehicle comprising:

a vehicle speed controlling means for adjusting vehicular traveling speed;

at least one cruise speed setting means for manually commanding a desired cruise speed, said cruise speed setting means being operable between an active state in which a desired cruise speed is commanded and an inactive state in which a command for the desired cruise speed is absent;

a vehicle speed monitoring means for monitoring an actual vehicle traveling speed to produce a vehicle speed indicative signal;

a controller responsive to the manually entered command from said cruise speed setting means for setting a target cruise speed, comparing the actual vehicle traveling speed represented by said vehicle speed indicative signal with said target cruise speed and outputting a cruise control signal for controlling operation of said vehicle speed control means to reduce a difference between said actual vehicle traveling speed and said target cruise speed to zero;

a power supply means for supplying power to said controller;

a system main switch comprising an ON/OFF switch for commanding cruise control operation at an ON position; and means, responsive to an ON-set of said system main switch, for discriminating a status of said cruise speed setting means, enabling said controller when said cruise speed setting means is in inactive state and disabling said controller when said cruise speed setting means is in active state.

5. A cruise control system for an automotive vehicle comprising:

a vehicle speed controlling means for adjusting vehicular traveling speed;

at least one cruise speed setting means for manually commanding a desired cruise speed, said cruise speed setting means being operable between an active state in which a desired cruise speed is commanded and an inactive state in which a command for the desired cruise speed is absent;

a vehicle speed monitoring means for monitoring an actual vehicle traveling speed to produce a vehicle speed indicative signal;

a controller responsive to the manually entered command from said cruise speed setting means for setting a target cruise speed, comparing the actual vehicle traveling speed represented by said vehicle speed indicative signal with said target cruise speed and outputting a cruise control signal for controlling operation of said vehicle speed control means to reduce a difference between said actual vehicle traveling speed and said target cruise speed to zero;

a power supply means for supplying power to said controller;

a system main switch comprising an ON/OFF switch for commanding cruise control operation at an ON position;

said controller being responsive to an ON-set for initiating cruise control operation and initially performing an initialization process including resetting the target cruise speed in order to place said controller at a stand-by state; and means, responsive subsequently to the initialization process of said controller, for discriminating a status of said cruise speed setting means, enabling said controller when said cruise speed setting means is in an inactive state and disabling said controller when said cruise speed setting means is in an active state.

* * * * *